United States Patent [19]

Cerbone et al.

[11] 4,158,112
[45] Jun. 12, 1979

[54] HANDS-FREE ANSWER ARRANGEMENT ON INTERCOM FOR KEY TELEPHONE SYSTEM

[75] Inventors: Ralph L. Cerbone; Robert A. Lindsay, both of Indianapolis; John M. Noonan, Greenfield; Martin G. Rudroff, Indianapolis, all of Ind.

[73] Assignee: Bell Telephone Laboratories, Incorporated, Murray Hill, N.J.

[21] Appl. No.: 900,425

[22] Filed: Apr. 27, 1978

[51] Int. Cl.² ............................................. H04Q 5/20
[52] U.S. Cl. .............................. 179/99 A; 179/1 HF; 179/18 AD
[58] Field of Search .................. 179/99, 81 B, 100 L, 179/1 H, 1 HF, 18 AD, 37–40

[56] References Cited

U.S. PATENT DOCUMENTS

| | | | |
|---|---|---|---|
| 3,342,944 | 9/1967 | Barbato et al. | 179/18 AD |
| 3,385,935 | 5/1968 | Anderson et al. | 179/99 |
| 3,743,791 | 7/1973 | Duff et al. | 179/99 |
| 3,872,262 | 3/1975 | Kerman | 179/99 |
| 3,904,834 | 9/1975 | Shinoi et al. | 179/99 |
| 3,976,847 | 8/1976 | Bidlack et al. | 179/99 |
| 3,979,563 | 9/1976 | Kita et al. | 179/99 |
| 4,010,332 | 3/1977 | Matheny | 179/99 |
| 4,035,588 | 7/1977 | Marshall et al. | 179/99 |
| 4,063,047 | 12/1977 | Huryn | 179/99 |

Primary Examiner—Kathleen H. Claffy
Assistant Examiner—Gerald L. Brigance
Attorney, Agent, or Firm—Harry L. Newman; Samuel R. Williamson

[57] ABSTRACT

An intercom arrangement in a key telephone system is disclosed that permits the answering of intercom calls "hands-free" at a called station. Intercom calls are originated in the standard manner, with the calling party lifting the handset at a station and selecting an idle intercom line. After the calling party depresses a direct station selection button that corresponds to the called station, a hands-free answer unit located in the called station automatically connects to the proper intercom line and provides an alerting tone to both the calling and called station. The calling party is then able to converse with the called party by alternately activating a loudspeaker and a microphone contained in the called station.

13 Claims, 8 Drawing Figures

HANDS-FREE ANSWER ARRANGEMENT ON INTERCOM FOR KEY TELEPHONE SYSTEM

TECHNICAL FIELD

This invention relates to a key telephone system and in particular to a multilink intercommunication arrangement which provides hands-free answer operation.

BACKGROUND OF THE INVENTION

Many key telephone systems employ loudspeaking intercom arrangements that allow a subscriber to communicate with other subscribers via a special microphone and loudspeaker assembly furnished in addition to a conventional station set. Some of the earlier prior art systems required the subscriber at the called station to initially activate the loudspeaker and microphone arrangement in the telephone set to answer an intercom call. This was found to be unsatisfactory because the called subscriber would often be engaged in an activity or located just out of reach of the telephone set such that activating the intercom arrangement was inconvenient. As a result, later systems having a single intercom line allowed the subscriber at the calling station to activate the loudspeaker and microphone of the called station, thus allowing the called subscriber to respond hands-free. In this type of system, the hands-free answer station contained circuitry that would sense a ringing condition at the called station in order to activate the hands-free answer mode.

A unique problem associated with the hands-free answer operation in a multiple intercom link key telephone arrangement is the difficulty in determining which intercom line a call is originating on. In addressing this problem, one arrangement of interest using multiple intercom links in U.S. Pat. No. 4,063,047 issued on Dec. 13, 1977 to W. A. Huryn. This arrangement uses a common selector circuit to which called station activation digits are transmitted from the calling station. This combines with another circuit that monitors a flashing lamp signal to determine which intercom line is currently in the active calling state such that upon the joint detection of ringing signals and lamp flashing signals, the hands-free answer circuit at the selected call station is activated.

Another arrangement of interest using multiple intercom links is U.S. Pat. No. 3,342,944 issued on Sept. 19, 1967 to R. E. Barbato et al. in which calling and called stations are first interconnected by a single signal link and thereafter transferred to one of a plurality of talking links.

In prior art systems, there is usually a considerable amount of logic circuitry associated with the multiple intercom line arrangement. Such extensive logic is necessary because of the complexity of the circuits involved in connecting to a correct one of the multiple intercom lines for hands-free answer conversation. In addition, in implementing the hands-free answer operation, those prior art arrangements having station sets with assigned intercom numbers must have each calling station transmit digital data signals associated with the station to be called whenever a hands-free answer connection is desired.

It is desirable at times that a subscriber at a station be able to rapidly establish a hands-free answer call to other subscribers within a multiple intercom line system without the dialing of any station numbers. In accordance with the present invention, such service may be provided for any or all stations requiring it with minimally complex circuitry. Summary of the Invention A key telephone station is equipped with a hands-free answer intercom (HFAI) module which allows for hands-free answer operation. Also included are microphone-off and do-not-disturb features which respectively mute a microphone within the module and block all incoming intercom calls to the station. An intercom call is originated in the standard manner by a station user going off-hook on an idle intercom line and depressing a direct station selection (DSS) button corresponding to a station being called. Depressing the DSS button activates the HFAI module in the called station.

Since the key telephone system has multiple intercom lines, it is not apparent at the station being called which intercom line the station user has selected for the hands-free answer call. It is therefore necessary for the HFAI module at the called station to determine which of the intercom lines the user has selected and connect a talk path thereto. This is accomplished through use of an out-of-the-voice frequency band signaling circuit incorporated in the HFAI module. The HFAI module generates its own out-of-band signal that is applied sequentially to each intercom line in the system. When applied to the intercom line to which the calling station is connected, a closed loop exists and this signal will be returned to the HFAI module. This closed loop consists of the intercom line path connecting the two stations, the side tone path and a preamplifier within the calling station, and the activated DSS signaling lead between the calling station and the HFAI equipped called station.

The closed loop system relaxes the design requirements on both an out-of-band oscillator and detector in the HFAI module since the detector is not required to recognize the signals from other oscillators in the key telephone system. Also, utilization of the out-of-band signal for line selection allows for the interrogating of an intercom line that is in use. The frequency of the out-of-band signal is beyond the frequency response of the handset receiver and loudspeaker used in the key telephone system. Therefore, the HFAI module may interrogate each line without disturbing an on-going conversation thereon by other parties. The interrogation continues until it reaches the intercom line selected by the party at the calling station.

When the HFAI module detects the return of the out-of-band signal on an intercom line, it seizes that line as the appropriate one for HFAI communications. An alerting tone is then placed on the intercom line and is heard over the handset receiver of the calling station and loudspeaker of the called station informing the parties that the HFAI call has been established. The calling party operates in a push-to-talk and release-to-listen mode. When the calling party speaks into the station handset while pushing the DSS button, the called party receives the call over the loudspeaker in the station set. But when the calling party releases the DSS button, the microphone and associated amplifier in the HFAI module are connected to the intercom line allowing the called party to respond completely hands-free. The HFAI call is terminated either by the calling party hanging up or by the called party coming off-hook on the intercom line being used.

DETAILED DESCRIPTION

Figure 1:
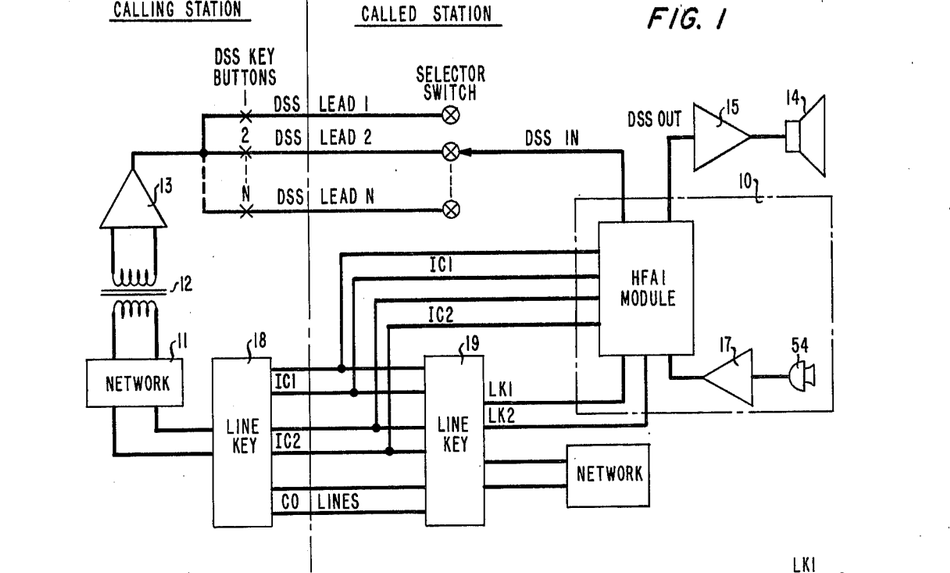
FIG. 1 shows a block diagram of a hands-free answer arrangement in a key telephone system in accordance with the present invention.

Referring now to FIG. 1 of the drawing, in a hands-free answer arrangement in accordance with the present invention there is shown a block diagram of a calling station and a HFAI equipped called station in a key telephone system. In the operation of the system, a party at the calling station comes off-hook, selects an intercom (IC) line on line key 18, and depresses Direct Station Selection (DSS) key button 2. This closes a switch that is connected to a HFAI module 10 in the called station via DSS lead 2 and DSS IN lead, the leads being interconnected by a selector switch. Circuitry within the HFAI module 10 senses a level change on the DSS IN lead and places a 13 ms burst of 20 kHz on intercom line 1 (IC1). If the party at the calling station has selected IC1 on line key 18, the 20 kHz signal is coupled through the calling station's network 11, transformer 12, amplifier 13 and down the DSS IN lead back to the HFAI module 10 which seizes IC1. With the seizure of IC1, the HFAI module 10 places an alerting tone of 625 Hz on the seized line for 750 ms which is heard in the calling station's handset receiver. This alerting tone is also coupled via the DSS IN lead back to the HFAI module 10, and then through a DSS OUT lead and an amplifier 15 to a loudspeaker 14 of the called station. After the tone, the party at the calling station may then talk to the HFAI station by continuing to depress the DSS key button 2. When the party at the calling station releases the DSS key button 2, amplifier 15 in the called station telephone set is disabled, and the HFAI module 10 connects a microphone 54 and its amplifier 17 to the IC line, thus allowing the party at the called station to respond hands-free. Subsequent depressions of the DSS key button 2 will remove the microphone amplifier 17 from the IC line and activate loudspeaker 14. No alerting tone is applied after the initial depression of the DSS key button.

If at the initial depression of the DSS key button the party at the calling station is connected to intercom line 2 (IC2) or a central office (CO) line through line key 18, the 13 ms burst of 20 kHz placed on IC1 cannot be coupled through the calling station. When the HFAI module 10 fails to sense the signal on the DSS IN lead while it is coupled to IC1, the circuitry waits for 13 ms and then places the 13 ms burst of 20 kHz on IC2. If the party at the calling station is connected to IC2, the 20 kHz signal is coupled through the calling station back to the HFAI module 10 which seizes IC2. Thus, intercom calls originating on IC2 are processed the same as those calls originating on IC1. But if the party at the calling station is connected to a CO line, the call is ignored.

An established HFAI call is terminated when the party at the calling station hangs up, thus vacating the seized IC line. Or when privacy is desired, the party at the called station can come off-hook on the seized IC line, i.e., picking up his handset and depressing the appropriate IC line on line key 19. The HFAI feature will be deactivated, thereby allowing the two parties to converse on their respective handsets.

Figure 2:
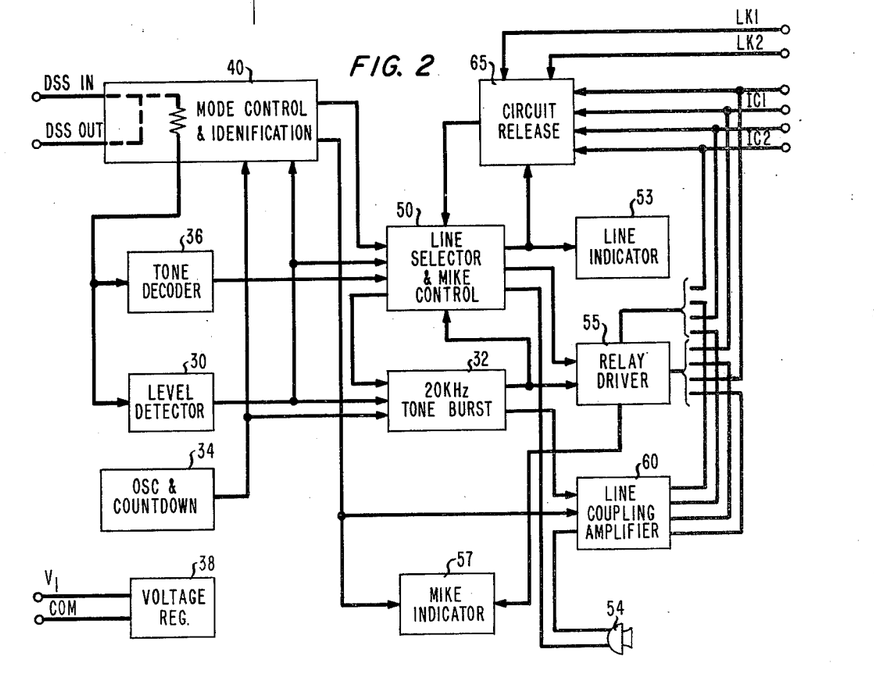
FIG. 2 shows in block diagram the hands-free answer module used in the present arrangement.

With reference to FIG. 2, there is shown an embodiment of the HFAI module associated with each HFAI equipped station. The HFAI module allows for three modes of operation: Hands-Free Answer which permits the answering of intercom calls completely hands-free, Do Not Disturb which blocks all incoming intercom calls and Mike Off which inhibits the microphone contained within the module.

When the HFAI module is signaled and is in the Hands-Free Answer mode, the level detector circuit 30 detects a dc voltage shift on the DSS IN lead and enables a tone burst circuit 32. Generated in an oscillator and countdown circuit 34, a 13 ms 20 kHz signal is coupled by the tone burst circuit 32 onto IC1 via a line coupling amplifier circuit 60. If the call is being placed on IC1, the 20 kHz signal will be received by the set of the calling station and transmitted back to the HFAI module via the DSS IN lead. A tone decoder circuit 36 detects the 20 kHz signal and triggers a line selector and mike control circuit 50. In turn, the line selector and mike control circuit 50 turns on a line indicator circuit 53 for IC1, provides power to a microphone 54, disables the tone burst circuit 32, and triggers a mode control and identification circuit 40.

Also generated in the oscillator and countdown circuit 34 is a 625 Hz alerting tone coupled through the mode control and identification circuit 40 to the line coupling amplifier circuit 60 for 750 ms. In order for the line coupling amplifier circuit 60 to transmit the alerting tone to the appropriate IC line, the mode control and identification circuit 40 provides an enable input to the line selector and mike control circuit 50 during the 750 ms causing it to activate a relay driver circuit 55 for IC1. Also during the 750 ms, the microphone 54 is held disabled. At the end of the 750 ms, the relay driver circuit 55 for IC1 is controlled by the DSS key button of the calling station which connects to the DSS IN lead. When the DSS key button is released, the relay driver circuit 55 couples the microphone 54 to the IC line via the line coupling amplifier 60. The relay driver 55 also activates a mike indicator circuit 57 which alerts the party at the called station that the microphone 54 is activated. When the DSS key button is again depressed, the relay driver circuit 55 is released, thus disconnecting the output of the line coupling amplifier circuit 60 from the IC line. When IC1 is vacated or when the HFAI equipped station set goes off-hook on IC1 to use the handset, a circuit release circuit 65 provides an input to the line selector and mike control circuit 50 to reset the HFAI module. The HFAI module is then ready to receive another call.

If the call is being placed on IC2, the 20 kHz signal transmitted down IC1 does not appear on the DSS IN lead; the tone decoder circuit 36, therefore, does not detect it. Thirteen ms after the 20 kHz signal on IC1, the tone burst circuit 32 provides a 13 ms 20 kHz signal on IC2. The 20 kHz signal is then detected by the tone decoder circuit 36 and the line selector and mike control circuit 50 is triggered. Again, as for IC1, the line selector and mike control circuit 50 turns on the line indicator circuit 53 for IC2, provides power to the microphone 54, turns off the tone burst circuit 32, and triggers the mode control and identification circuit 40. Further, the relay driver circuit 55 for IC2 is energized for coupling the 625 Hz from the oscillator and countdown circuit 34 via the mode control and identification circuit 40 onto IC2. This time the relay driver circuit 55 for IC2 is controlled by the DSS key button of the calling station. The microphone 54 is again coupled onto IC2 whenever the DSS button is released. The HFAI module is reset whenever IC2 is vacated or the HFAI equipped station set goes off-hook on IC2.

When in the Mike-Off mode, the HFAI module goes through the cycle discussed above except that the microphone 54 is held disabled. When in the D0-Not-Disturb mode, the same cycle is followed except that after the 20 kHz is detected, a 156 Hz tone is placed on the selected IC line by the mode control and identification circuit 40 and will be received in the handset receiver of the calling station. This tone will persist for as long as the DSS button is depressed. In addition, the DSS OUT lead is disconnected to inhibit any incoming signaling.

A voltage regulator circuit 38 aids in stabilizing the frequency of the oscillator and countdown circuit 34 and provides the voltage levels necessary for powering the logic within the HFAI module.

Figure 4:
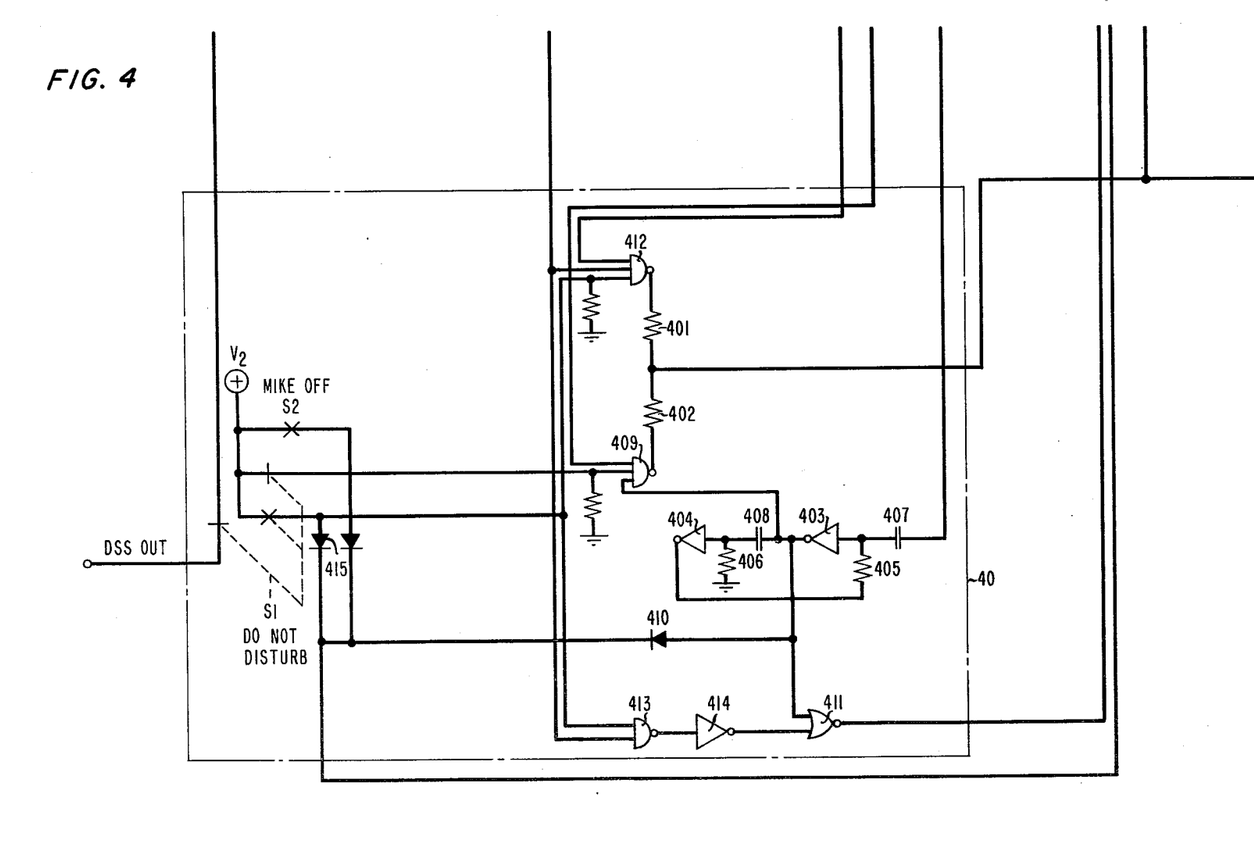
Figure 5:
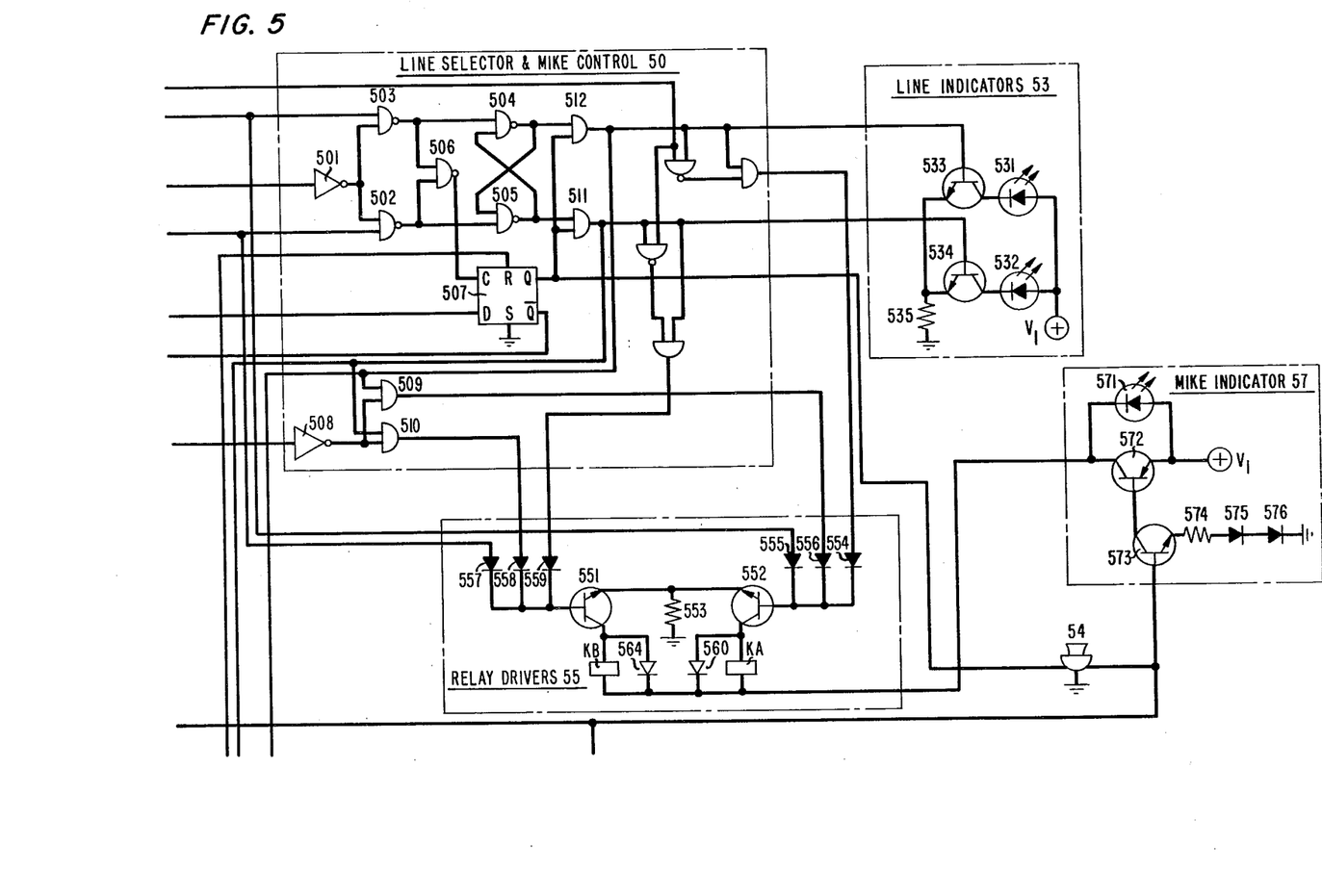
Figures 6, 7:
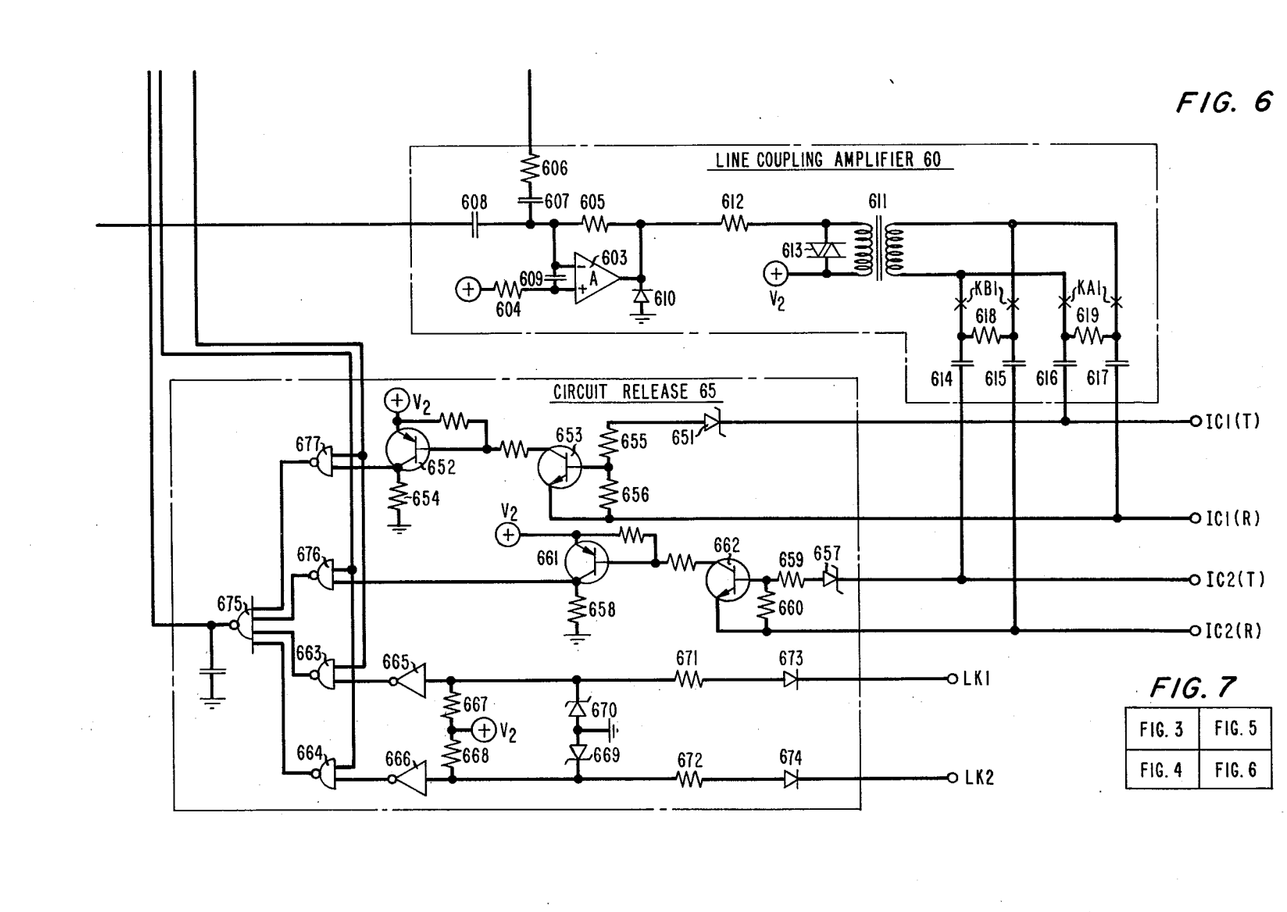
FIG. 7 shows the arrangement of FIGS. 3 through 6.

With reference to FIGS. 3, 4, 5, and 6, which are arranged in accordance with FIG. 7, the first digit of the reference number of each component refers to the drawing figure number where that component is shown. The level detector circuit 30 provides a logic input whenever the DSS IN lead associated with the HFAI station goes to one diode drop below one-half the positive voltage level $V_1$. The DSS IN lead is normally held at $V_1$ through a resistor attenuator consisting of resistors 301, 302, and 361. Whenever the positive voltage level on the DDS IN lead decreases by more than the indicated threshold, transistor 303 will turn on causing the junction of resistors 304 and 305 to go toward $V_1$. Resistors 301, 302 and 361, along with capacitor 306, prevent false triggering of the HFAI circuit by noise or by another auxiliary service which causes the DSS IN lead to drop approximately one-fifth of the voltage level $V_1$. When transistor 303 saturates, the junction of voltage-divider resistors 304 and 305 would normally go to one-half of the voltage level $V_1$, but because of the input protection diodes provided within the integrated circuit logic that is used in this invention, it is held to one diode drop over the voltage level $V_2$ that is provided by the voltage regulator circuit 38.

Figure 3:
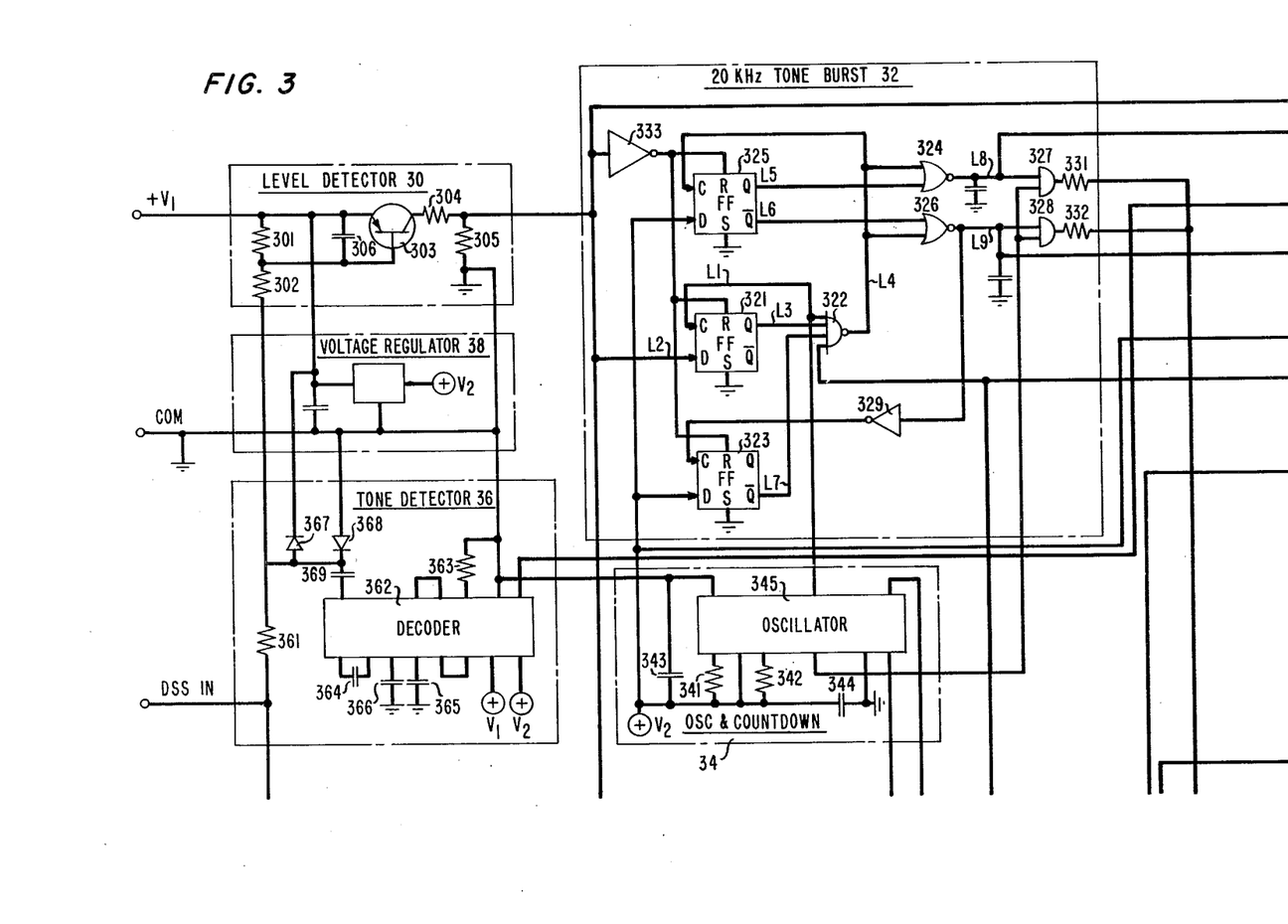
FIGS. 3 through 6 present a schematic diagram showing the detailed circuitry of the hands-free answer module.

The oscillator and countdown circuit 34 provides a 39 Hz clock frequency for the HFAI circuitry, the 20 kHz out-of-band signal, and alerting tones of 156 and 625 Hz. A basic oscillator frequency of 80 kHz is chosen in order to obtain the desired frequencies at existing outputs on the oscillator 345. This frequency is determined by resistors 341, 342 and capacitor 343. Capacitor 344 bypasses the voltage level $V_2$ to minimize the chance of oscillator frequencies feeding back into the voltage regulator 38.

Figure 8:
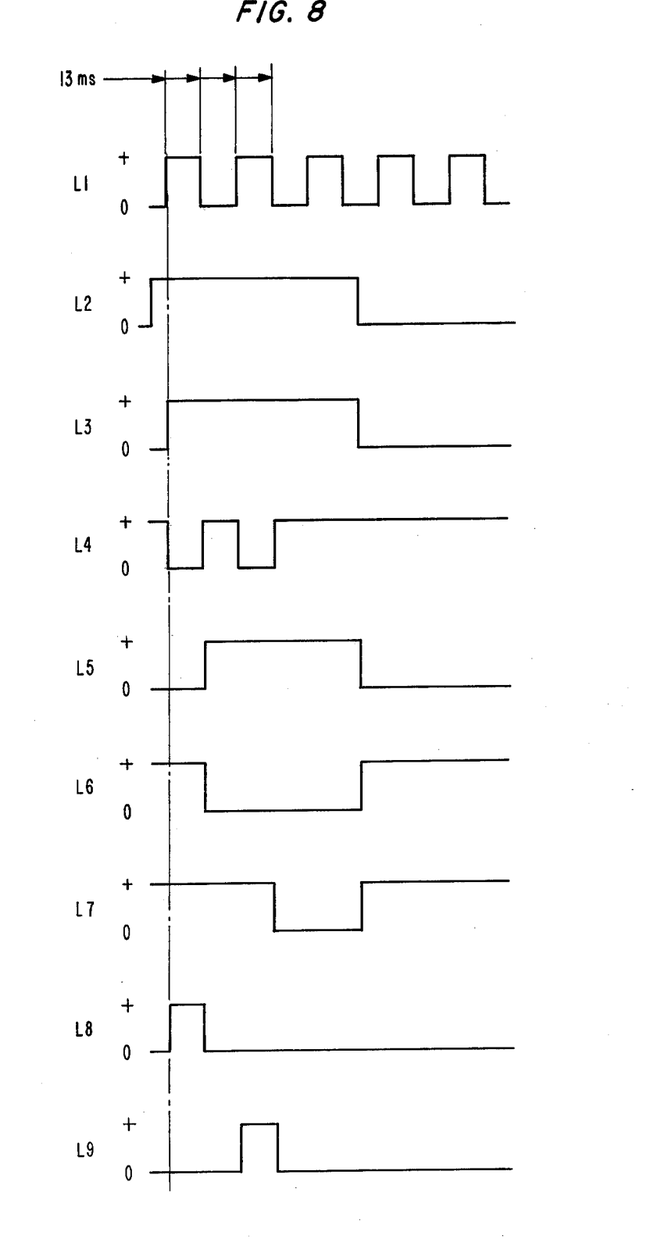
FIG. 8 is a timing diagram depicting waveforms of particular time multiplex signals employed in this invention.

The 20 kHz out-of-band signal generated by the oscillator and countdown circuit 34 is used to produce two 13 ms bursts that can alternately be coupled to IC1 and IC2. This is achieved by the 20 kHz tone-burst circuit 32 which can be more easily understood when FIG. 8 and the waveforms depicted thereon are considered in conjunction with FIG. 3. When the level detector 30 detects an incoming HFAI call, the collector of transistor 303 will go positive coupling the signal at the junction of resistors 304 and 305 over line L2 to the D input of flip-flop 321. The Q output of flip-flop 321 in turn will go to a logic one on the first positive-going excursion of the 39 Hz signal coupled from the oscillator 345 to the flip-flop clock input over line L1. This logic one is coupled over line L3 to one of the four inputs of NAND gate 322. If the signal on line L7 and the output from $\overline{Q}$ of flip-flop 323 are at a logic one, a positive excursion of the 39 Hz signal on line L1 will also cause the output of NAND gate 322 to drop to logic zero. This logic zero coupled over line L4 to one of the two inputs of NOR gate 324, along with a logic zero on line L5 coupled to the other input of NOR gate 324, causes the output on line L8 to go to a logic one. Thirteen ms later, line L4 will change to a logic one causing the output of NOR gate 324 on line L8 to go to logic zero. The signal on line L4 is also coupled to the clock input of flip-flop 325 causing it to change states (line L5 goes to logic 1, and line L6 goes to logic zero). In another 13 ms, the second positive-going excursion of the 39 Hz signal on line L1 will cause the output of NAND gate 322 to go to a logic zero. This signal coupled over line L4 to one of the two inputs of NOR gate 326 will cause the output thereof on line L9 to go to logic one and remain for 13 ms. The outputs of NOR gates 324 and 326 are coupled to AND gates 327 and 328, respectively, where they are mixed with the 20 kHz tone to provide 13 ms bursts of 20 kHz separated by 13 ms. When the output of NOR gate 326 goes to logic zero at the end of its 13 ms pulse, the signal is coupled through inverter 329 to the clock input of flip-flop 323 causing its $\overline{Q}$ output to go to logic zero. This logic zero is coupled to one of the inputs of NAND gate 322 which prevents any additional changes of the state of this gate with the clock pulses on input line L1. The flip-flops 321, 323 and 325 are reset by a logic one appearing on the output of inverter 333 whenever the DSS IN lead returns to voltage level $V_1$ and transistor 303 shuts off.

The outputs of AND gates 327 and 328 are respectively coupled through resistors 331 and 332 to the line coupling amplifier circuit 60. Contained therein is an amplifier circuit which comprises an operational amplifier 603 powered from the voltage level $V_1$ and biased through resistor 604 to voltage level $V_2$. Since the amplifier is biased for unity DC gain in the quiescent condition, an output level of $V_2$ is obtained. Used in a summing configuration, the amplifier utilizes feedback resistor 605 along with resistors 606, 331, 332, 401 and 402 to provide the proper gain levels. Capacitors 607 and 608 are coupling capacitors, while capacitor 609 acts as an RF bypass. Diode 610 prevents the amplifier output voltage from exceeding a threshold set above the voltage level $V_2$. It also prevents noise pulses from causing the output of amplifier 603 from approaching voltage level $V_1$ whereby current could possibly source back into the output of the voltage regulator circuit 38 causing damage thereto.

The relay driver circuit 55 connects the outputs of the line coupling amplifier 60 to the IC lines. The relay driver circuit 55 consists of two transistor switches 551 and 552, a current limiting resistor 553, and two diode matrices 554, 555, 556 and 557, 558, 559. When a logic one appears at the anode of a matrix diode, the base of the transistor associated with that particular matrix is biased at one diode drop below voltage level $V_2$ which causes the transistor to turn on. Relay coil KA or KB connected to that transistor is energized, thereby closing contacts KA1 or KB1, respectively, in the line coupling amplifier circuit 60. Diodes 560 and 561 provide a current discharge path when the relay coils are deenergized. When transistor 551 or 552 turns on, it instantaneously saturates due to the inductance of the respective relay coil KA or KB. Diodes 560 and 561 are also used to limit this instantaneous voltage buildup across these coils KA and KB.

The line coupling amplifier circuit 60 also has an impedance matching section that couples the output of the amplifier 603 to either IC1 or IC2. A transformer 611 is used to couple the floating balanced IC lines to the unbalanced output of the amplifier 603. Because of impedance level changes resulting from a different number of sets being off-hook on a line at once, a nominal impedance of 3000 is used as a line coupling impedance. This is achieved by the turns ratio of the transformer 611 and the ohmic value of resistor 612. The maximum signal that can be delivered to the IC lines is limited by varistor 613. Capacitors 614, 615, 616 and 617 are used to isolate the transformer 611 from the IC lines. Resistors 618 and 619 provide a charge path for the potential that is maintained on the isolating capacitors to reduce to an inaudible level clicks that would otherwise be heard on the IC lines as the relay contacts are closed.

At the same time that a 13 ms burst of 20 kHz is coupled from AND gate 327 through resistor 331 and amplifier 603 to transformer 611, a 13 ms pulse is coupled to the relay driver circuit 55 through diode 555 to turn on transistor 552. Once energized by transistor 552, the KA relay thus causes the 20 kHz tone burst at the output of transformer 611 to be coupled to IC1. In a like manner, when a tone burst appears at the output of AND gate 328, it is coupled to IC2.

In order for an intercom link to be established, the 13 ms burst of 20 kHz applied to IC1 must be recognized by the HFAI module as the correct return signal. This is accomplished through use of the tone decoder circuit 36 which consists primarily of a phase-locked loop tone decoder 362 with a center frequency tuned to 20 kHz by means of resistor 363 and capacitor 364. The tone decoder 362 thus gives a logic zero output whenever 20 kHz appears at its input. Capacitors 365 and 366 are on delay and off delay timers respectively incorporated to prevent the decoder 362 from responding to noise transients. Diodes 367 and 368 are used to protect the input of the tone decoder 362 from electrostatic voltages that may be present on the DSS IN lead. Resistor 361 and capacitor 369 couple the signal on the DSS IN lead to the tone decoder 362. Resistor 361 also serves to limit the current through the diodes from an electrostatic pulse.

The line selector and mike control circuit 50 performs the functions of determining on which IC line the call is originating, and setting up the logic so that the alerting tones and output of microphone 54 may be coupled thereon. The line selector portion of the circuit has three inputs. One is from the output of the tone decoder circuit 36 and is coupled through inverter 501 to one of the two inputs found on both NAND gate 502 and NAND gate 503. The outer two line selector inputs are from the tone burst circuit 32 and are coupled to the remaining two inputs of NAND gates 502 and 503. If the call were originating on IC1, for example, a signal generated by the tone decoder circuit 36 would cause a logic one to be coupled to both NAND gate 502 and NAND gate 503. At the same time, the remaining input of NAND gate 503 is at a logic one. Thus the output of NAND gate 503 goes to logic zero causing the flip-flop consisting of NAND gates 504 and 505 to be forced to a state where the output of NAND gate 504 is at a logic one and NAND gate 505 is at a logic zero. In addition, the logic zero at the output of NAND gate 503 and the logic one at the output of NAND gate 502 combine in NAND gate 506 causing its output to go to a logic one setting flip-flop 507. The setting of flip-flop 507 is the action that denotes a line seizure, and the HFAI circuitry will remain dedicated to the IC line selected by the flip-flop consisting of NAND gates 504 and 505 until flip-flop 507 is reset by the circuit release circuitry 65 to be later discussed.

A mike control portion in the line selector and mike control circuit 50 is used to determine when the microphone 54 will be in an on or off condition. When flip-flop 507 is set, the Q output goes to logic one placing a voltage of $V_2$ on the microphone 54 thus powering a preamplifier contained therein. Powering the microphone in this manner avoids an acoustic feedback condition that might occur if the microphone were active during line interrogation. At the same time, the $\overline{Q}$ output of flip-flop 507 goes to logic zero shutting down the tone burst circuit 32 by inhibiting NAND gate 322.

In the line indicator circuit 53 are light-emitting diodes 531 and 532 that show which line the HFAI module has seized. This circuit is provided so that the called party will be able to determine which intercom line the call is being placed upon. When IC1 is seized the output of AND gate 512 goes to a logic one, transistor 533 turns on and light-emitting diode 531 will light. Or alternatively when IC2 is seized, the output of AND gate 511 goes to a logic one, transistor 534 turns on and the light-emitting diode 532 will light. Resistor 535 limits the current through transistors 533 and 534. Since AND gates 511 and 512 cannot both be at a logic one at the same time, the light-emitting diode 531 or 532 will accurately reflect the IC line that the HFAI has seized.

The mode control and identification circuit 40 is comprised of the Mike-Off and Do-Not-Disturb control switches which mute the microphone 54 and provide logic gating for the alerting tones, respectively. When an IC line has been selected and flip-flop 507 set, the negative-going pulse from the Q output of flip-flop 507 causes a one-shot timer, consisting of inverters 403, 404, resistors 405, 406, capacitors 407 and 408, to be triggered. The R-C time constants are such that the output of inverter 403, which is normally at logic zero, will go to logic one and remain there for 750 ms and then return to logic zero. This 750 ms pulse turns on NAND gate 409 if the Do-Not-Disturb switch S1 is in the normal position presenting a logic one to NAND gate 409. This allows the 625 Hz signal generated by the oscillator and countdown circuit 34 to be coupled through NAND gate 409 and resistor 402 to the line coupling amplifier circuit 60. In addition, the 750 ms timing pulse is coupled through diode 410 to microphone 54. The internal microphone preamplifier is shut off thereby preventing an acoustic feedback condition during tone bursts.

At the same time the 625 Hz signal appears on the line coupling amplifier circuit 60, the 750 ms pulse is coupled through NAND gate 411, inverter 508 to AND gates 509 and 510 in the line selector and mike control circuit 50. Depending on the state of the line selector flip-flop (NAND gates 504, 505), the output of one of these gates will go to a logic one closing either the KA or KB relay, thereby placing the output of the line coupling amplifier 603 with the 625 Hz tone on the appropriate IC line. This signal is then heard in the handset receiver of the calling station and is coupled via the DSS IN lead to the called station's loudspeaker.

If the Do-Not-Disturb switch S1 is activated when the line selection is made, the 625 Hz signal will be blocked at NAND gate 409, but the 156 Hz signal from the oscillator and countdown circuit 34 will be coupled through NAND gate 412 and resistor 401 to the line coupling amplifier circuit 60. The appropriate line coupling relay contained in line coupling amplifier circuit 60 would be energized by a logic one being coupled from the Do-Not-Disturb switch S1 through NAND gate 413, inverter 414, NOR gate 411, inverter 508, and onto the proper relay driver by AND gate 509 or 510. Thus, when the DO-Not-Disturb switch S1 is activated, a 156 Hz tone will be placed on the appropriate IC line to be heard in the handset receiver of the calling station. The Do-Not-Disturb switch S1 also couples the $V_2$ voltage level through diode 415 which shuts off the microphone 54. Additionally, the Do-Not-Disturb switch S1 opens the connection between the DSS IN lead and the input to the speaker amplifier of the HFAI equipped set to prevent any tone or voice signals from reaching the loudspeaker and disturbing the called party.

The mike indicator circuit 57 alerts a user of the HFAI equipped set that the microphone 54 is active. The indicator circuit 57 comprises a light-emitting diode 571 connected in series with the line coupling relay coils KA and KB. Each time either relay is active and the amplifier 603 is coupled to an IC line, the light-emitting diode 571 is illuminated denoting that the microphone 54 is active. The exception is when the microphone 54 is muted because the HFAI modules Do-Not-Disturb or Mike-Off feature is activated. To prevent the indicator 57 from being on during this time, the circuit consisting of transistors 572, 573, resistor 574, and diodes 575 and 576 is utilized. The microphone 54 is normally biased at some low voltage level, and transistor 573 will not draw base current because of the three diode drops from its base to circuit common. With transistor 573 off, transistor 572 is also not conducting, and diode 571 is free to light whenever relay KA or KB is energized.

The circuit release circuit 65 releases the HFAI module once it is no longer needed so that the module may be restored to the ready state. This may be done by either one of two ways: The calling party can hang up, or the called party can come off-hook on the seized IC line. The former condition is satisfied by the incorporating of threshold level detector circuits which are connected across the IC lines to monitor DC voltage changes.

The IC line DC voltage is designed to be approximately 12 volts when vacant, while a line with one set off-hook is less than 7 volts. With IC1 vacant, the 12 volts on the IC line causes zener diode 651 to be in a conducting state. This in turn causes transistors 652 and 653 to be held in the on state, thereby producing a logic one across resistor 654. When a set comes off-hook on IC1, the line voltage drops below the threshold set by the combination of diode 651, resistors 655 and 656 so that transistors 652 and 653 turn off, and the voltage across resistor 654 goes to zero. This logic zero is presented to an input of NAND gate 677 whenever a set comes off-hook on IC1. In a like fashion, the threshold circuit comprising zener diode 657, resistors, 658, 659, 660, transistors 661 and 662 monitors and responds to a voltage change on IC2 such that a logic zero will be presented to an input of NAND gate 676 whenever a set comes off-hook on IC2. Once the HFAI module has seized the IC line, returning the set to its on-hook position will generate a reset pulse and cause the module to be restored to the ready state.

The releasing of the HFAI module when the called party comes off-hook on the seized IC line is accomplished by grounding the lock leads LK1 and LK2 externally through a set of switchhook and line key contacts on a line key associated with the key telephone station. By grounding the lock leads LK1 or LK2, a logic one will be presented to inputs of NAND gates 663 and 664, respectively. These inputs are normally held low by the inverters 665 and 666 which are coupled to the $V_2$ bias voltage via resistors 667 and 668, respectively. Zener diodes 669, 670, along with resistors 671 and 672, provide electrostatic protection for inverters 665 and 666. Diodes 673 and 674 provide isolation for other key telephone station functions connected through the common switchhook contacts.

How the threshold level detectors and the grounding of the lock leads specifically reset the HFAI module is determined in the following manner. The output of NAND gate 675 is held low since the outputs of the four NAND gates 676 677, 663 and 664 are normally at a logic one. Once an IC line is seized, any one of the outputs of the four NAND gates 676, 677, 663 or 664 going to logic zero will generate a reset pulse at the output of NAND gate 675. By way of example, when the calling party comes off-hook on IC2, the signal coupled to NAND gate 676 from the collector of transistor 661 goes from logic one to logic zero. Once IC2 has been seized, AND gate 511 couples a logic one to inputs of NAND gates 676 and 664. The outputs of these gates remain at logic one, however, since the input to NAND gate 676 from transistor 661 and the input to NAND gate 664 from inverter 666 are at logic zero. If at this time IC2 were vacated by the calling party hanging up, the voltage on IC2 would go to 12 volts, and a logic one would be produced at the collector of transistor 661. This generates a reset pulse which causes the output of NAND gate 676 to go low, and therefore, the output of NAND gate 675 to go high, resetting flip-flop 507. Likewise, if IC2 were seized and IC2 lock lead LK2 were grounded by the called party coming off-hook on IC2, a logic one would be coupled from inverter 666 to NAND gate 664 causing the output thereof to go low. Once again this produces a reset pulse at the output of NAND gate 675 for flip-flop 507. The same type of action would occur if IC1 line were seized and either the calling party hangs up, or lock lead LK1 were grounded.

Various modifications of this invention are contemplated and may obviously be resorted to by those skilled in the art without departing from the spirit and scope of the invention as hereinafter defined by the appended claims.

We claim:

1. In a key telephone system having a plurality of stations, each station having means for connecting to one of a plurality of intercom lines and means for initiating telephone intercommunication with one of the other stations, a hands-free answer control circuit being associated with each one of the plurality of stations having hands-free answer capability characterized in that the hands-free answer circuit comprises:
  detection means responsive to the initiating means of an other station;
  means operable in response to the detection means for producing an out-of-band signal and applying it to the intercom lines one at a time, the signal being returned from the other station when applied to the intercom line to which the other station is connected; and
  means responsive to the return of the out-of-band signal for seizing the intercom line to which the signal is then applied and providing a call connection having hands-free answer capability.

2. The invention as set forth in claim 1 wherein the detection means comprises a level detector operable in response to a voltage level shift produced by the initiating means.

3. The invention as set forth in claim 1 wherein the means operable in response to the detection means comprises an oscillator and countdown circuitry for producing an out-of-band signal, a line coupling amplifier circuit for applying the out-of-band signal to the intercom lines one at a time, and a tone burst circuit connecting the oscillator and countdown circuit to the line coupling amplifier, the tone burst circuit limiting the application of the out-of-band signal on each intercom line to a prescribed time period.

4. The invention as set forth in claim 3 wherein the means responsive to the return of the out-of-band signal comprises a tone decoder circuit for detecting the return of the out-of-band signal, a line selector and mike control circuit activated by the tone decoder circuit for turning off the tone burst circuit, providing power to a microphone for turning it on and triggering a mode control and identification circuit, the mode control and identification circuit determining which one of three modes, hands-free answer, do-not-disturb and mike-off, the hands-free answer circuit is operating therein.

5. The invention as set forth in claim 4 wherein the mode control and identification circuit when in the hands-free answer and mike-off modes provides an enable signal to the line selector and mike control circuit, the line selector and mike control circuit activating a relay driver circuit which connects the microphone to the intercom line having the out-of-band signal via the line coupling amplifier.

6. The invention as set forth in claim 5 further comprising a mike indicator circuit for reflecting the microphone being in an on condition, the mike indicator circuit being activated by the relay driver circuit.

7. The invention as set forth in claim 5 further comprising a line indicator circuit activated by the line selector and mike control circuit for reflecting the intercom line to which the hands-free unit is connected.

8. The invention as set forth in claim 5 further comprising a circuit release circuit for providing a reset signal to the line selector and mike control circuit when the station goes off-hook on the intercom line or when the intercom line is vacated by the other station.

9. In a key telephone system having a plurality of stations, each station having means for connecting to one of a plurality of intercom lines and means for initiating telephone intercommunication with one of the other stations, a hands-free answer control circuit being associated with each one of the plurality of stations having hands-free answer capability
characterized in that
the hands-free answer circuit comprises:
  detection means responsive to the initiating means of an other station;
  oscillation means operable in response to the detection means for producing an out-of-band signal and applying it to the intercom lines one at a time;
  decoder means operable in response to return of the out-of-band signal for identifying the intercom line to which the other station is connected;
  selection means responsive to the decoder means for seizing the identified intercom line and providing a call connection having hands-free answer capability; and
  means for monitoring the status of the intercom line and for releasing the hands-free answer control circuit when a hands-free answer call is terminated.

10. In a key telephone system having a plurality of stations and signaling means for initiating telephone intercommunications between the stations, a hands-free answer control circuit is associated with each one of the plurality of stations having hands-free answer capability for establishing telephone intercommunications between the stations and each hands-free answer control circuit is arranged for operation in a multiple intercom line system
characterized in that
the key telephone system comprises:
  closed loop means connecting a first one of the stations to a second one of the stations for providing a transmit path and a receive path for an out-of-band signal generated in the hands-free answer control circuit associated with a second one of the stations.

11. The invention as set forth in claim 10, the closed loop means comprising an intercom line connecting the first one of the stations with the second one of the stations, a side tone path and an amplifier within the first of the stations and a direct station selection line connecting the first one of the stations with the second one of the stations.

12. The invention as set forth in claim 10 further comprising means for applying the out-of-band signal sequentially to a plurality of intercom lines and means for seizing an intercom line connecting the first one of the stations to the second one of the stations.

13. The invention as set forth in claim 12 wherein the out-of-band signal is applied to an other one of the plurality of intercom lines presently engaged by another hands-free answer control circuit associated with another of the plurality of stations without interfering with the on-going conversation on the other one of the intercom lines.

* * * * *